Figure 1:
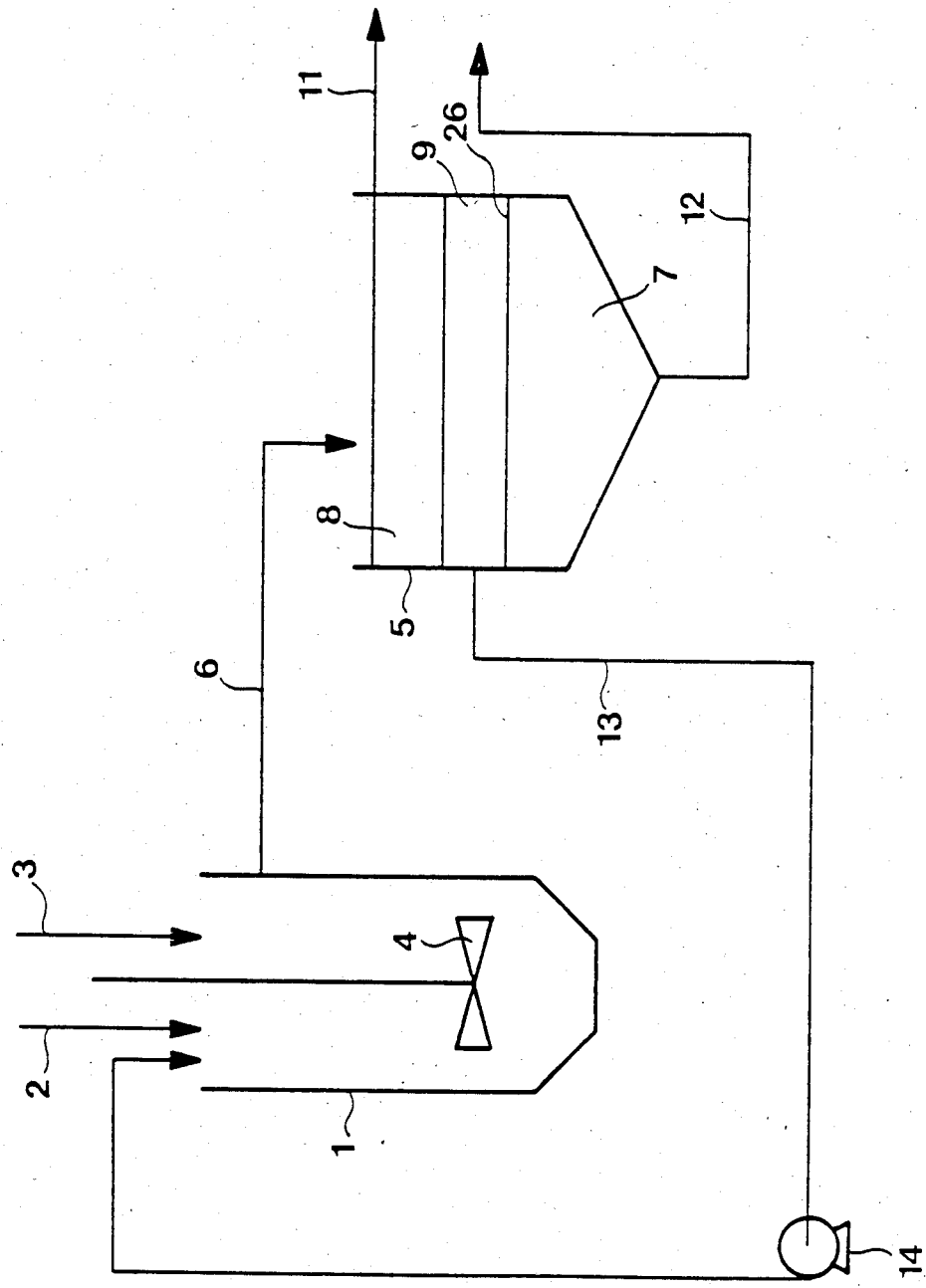

United States Patent [19]

Ninane et al.

[11] Patent Number: 4,605,771
[45] Date of Patent: Aug. 12, 1986

[54] PROCESS AND INSTALLATION FOR THE PRODUCTION OF AN ORGANIC SOLUTION OF A WATER-INSOLUBLE ORGANIC BASE

[75] Inventors: Léon Ninane; Claude Breton, both of Dombasle-sur-Meurthe, France; Constant Guerdon, Kraainem, Belgium

[73] Assignee: Solvay & Cie. (Societe Anonyme), Brussels, Belgium

[21] Appl. No.: 604,365

[22] Filed: Apr. 26, 1984

[30] Foreign Application Priority Data

Apr. 28, 1983 [FR] France ................ 83 07226

[51] Int. Cl.$^4$ .................. C07C 85/26; C07C 87/06
[52] U.S. Cl. .................... 564/497; 564/463; 260/701; 260/704; 210/702; 210/712; 210/713
[58] Field of Search ............ 564/497, 463; 210/702, 210/712, 713; 260/701, 704

[56] References Cited

U.S. PATENT DOCUMENTS 3,470,251 9/1969 Siegart et al. ............ 564/497
4,455,234 6/1984 Markham et al. ............ 210/712

FOREIGN PATENT DOCUMENTS 1082436 9/1967 United Kingdom ............ 564/497

OTHER PUBLICATIONS

Derwent Publications Abstract 78430T-E of Japanese Patent Application A-7241237.
Derwent Publications Ltd. Abstract 26992E/14 of Japanese Patent Application A-57034020.
Derwent Publications Ltd. Abstract 70522C/40 of Japanese Patent Application A-55/109219.
Chemical Abstracts, vol. 83, No. 26, Dec. 29th, 1975: 208079d, "Interesting aspects in the development of a novel solvent extraction process for producing sodium bicarbonate."
Chemical Abstracts, vol. 96, No. 18, May 3rd, 1982: 96:145423g, "Sodium bicarbonate."

Primary Examiner—Charles F. Warren
Assistant Examiner—John A. Sopp
Attorney, Agent, or Firm—Spencer & Frank

[57] ABSTRACT

An organic solution (2) of a water-immiscible chloride of an organic cation is mixed with a basic reagent and with water (3) in a reaction chamber (1), the mixture (6) which has reacted is transferred into a phase separation chamber (5) where the organic solution of the base (8) and an aqueous phase (7) containing a solid residue are separated and at least a part of a sludge (9) formed between the organic solution and the aqueous phase which have separated is recycled into the reaction chamber (1).

10 Claims, 2 Drawing Figures

PROCESS AND INSTALLATION FOR THE PRODUCTION OF AN ORGANIC SOLUTION OF A WATER-INSOLUBLE ORGANIC BASE

The present invention relates to a process and an installation for the production of organic solutions of water-insoluble organic bases, especially nitrogen-containing organic bases such as, for example, amines, by decomposition of water-immiscible chlorides of organic cations by means of a basic reagent.

A technique for the manufacture of sodium bicarbonate is known, in which an aqueous sodium chloride solution and an organic solution of a water-insoluble amine are mixed, and the resulting mixture is treated with a gas containing carbon dioxide and is then subjected to phase separation so that it separates into an aqueous sodium bicarbonate suspension, which is collected, and an organic solution of the amine hydrochloride (British Pat. No. A-1082436 (KAISER ALUMINUM & CHEMICAL CORPORATION), page 2, lines 105 to 125; Central Patents Index, Basic Abstracts Journal, Section E, Week T.49, Derwent Publications Ltd., London, abstract 78430T-E: Japanese Patent Application No. A-7241237 (Israel Mining Inds. Inst. Res. & Dev.)).

In the remainder of the description, the expression "amines technique" will denote this known technique for the manufacture of sodium bicarbonate.

Moreover, a technique for the production of ammonia by decomposition of ammonium chloride is known, in which an aqueous ammonium chloride solution is mixed with an organic solution of a water-insoluble amine and an inert gas or carbon dioxide is caused to circulate through the resulting mixture in order to remove from it the ammonia produced (Central Patents Index, Basic Abstracts Journal, Section E, Week E/14, Derwent Publications Ltd., London (Great Britain), abstract 26992E/14: Japanese Patent Application No. A-57034020 (TOYO SODA MFG K.K.)).

In the known techniques which have just been described, an organic solution of amine hydrochloride is collected as a by-product, and it is desirable to treat this in order to regenerate the amine. For this purpose, there is used a process in which the organic solution of amine hydrochloride is mixed with a basic reagent in an aqueous medium, generally an aqueous suspension of calcium hydroxide or magnesium hydroxide, and an organic solution of the regenerated amine and an aqueous solution of calcium chloride or magnesium chloride are collected separately (British Pat. No. A-1082436 (KAISER ALUMINUM & CHEMICAL CORPORATION), page 3, lines 5 to 9; Central Patents Index, Basic Abstracts Journal, Section E, Week T.49, Derwent Publications Ltd., London, abstract 78430T-E: Japanese Patent Application No. A-7241237 (Israel Mining Inds. Inst. Res. & Dev.)). In this known process, the difficulty of ensuring efficient recovery of the organic solution containing the regenerated amine is generally encountered; the regeneration of the amine by means of an aqueous calcium hydroxide suspension is in fact accompanied by the formation of a solid residue which to a large part consists of calcium carbonate or other solid impurities which interfere with the separation of the aqueous and organic solutions and cause a substantial loss of regenerated amine (Japanese Patent Application No. A-55/109219 (Toyo Soda)).

The invention proposes to overcome this disadvantage by providing a process which makes it possible to produce efficiently an organic solution of a water-insoluble base by decomposition of the chloride of an organic cation by means of a basic reagent, without loss of the base to be produced.

To this effect, the invention relates to a process for the production of an organic solution of a water-insoluble organic base, in which water, an organic solution of a water-immiscible chloride of an organic cation, and a basic reagent capable of decomposing the chloride of the organic cation to form the base are mixed, and the organic solution containing the base and an aqueous phase containing a solid residue are separated; according to the invention, in order to separate the organic solution containing the base from the aqueous phase, the phases are allowed to separate and at least a part of a sludge which separates the organic solution and the aqueous phase which have separated out is withdrawn and recycled into the abovementioned mixture.

In the process according to the invention, the base is, by definition, any organic reagent which has a sufficient basic character to form a chloride of an organic cation with hydrogen chloride.

In the process according to the invention, the choice of the organic solvent used to form the organic solution of the chloride of the organic cation is conditioned by the need that the solvent should also dissolve the base to be produced, thus forming an organic solution which is immiscible with water and with aqueous solutions. The choice of the nature and amount of organic solvent to be employed is moreover conditioned by the need for the solvent to form, with the base to be produced, an organic solution whose viscosity is no obstacle to efficient phase separation. To this effect, it is preferred to choose an organic solvent which at the working temperature has a viscosity which does not exceed 3 centipoises and preferably does not exceed 1.5 centipoises. Moreover, for reasons of safety and ease of use preference is given to organic solvents of low volatility which have a flash point above the working temperature. The choice of the organic solvent can also be conditioned by the intended use of the organic solution of the base to be produced. For example, if it is desired to produce an organic solution of an amine for the manufacture of sodium bicarbonate by the amines technique described above, it is desirable to choose an organic solvent which in addition to the properties mentioned above has a high rate of absorption of carbon dioxide at a moderate temperature, generally below 100° C. and more especially between 15° and 70° C.

It is preferred to use an organic solvent which gives an organic solution, containing the base to be produced, of lower specific gravity than that of the aqueous phase. Advantageously, the solvent chosen is such that the difference between the specific gravity of the aqueous phase and that of the organic solution to be produced is at least 5% of the specific gravity of the said organic solution, and preferably greater than 30% of this specific gravity.

For economic reasons, the process according to the invention is preferably carried out at a low temperature, generally a temperature below 60° C. and preferably between 15° and 40° C. Where it is intended to produce a nitrogen-containing base, for example an amine, the organic solvent can advantageously be selected from amongst the hydrocarbons, used in an amount which is so controlled that the solution of the chloride of the organic cation contains about 25 to 75% by weight of the chloride of the organic cation. Examples of organic solvents which can be used within the scope of the invention are xylene, the butylbenzenes, the methylethylbenzenes and more especially white spirit and the commercial solvents known under the trademarks ISOPAR (Esso), which is a mixture of isoparaffins, SOLVESSO (Esso), which is a mixture of aromatic compounds, SHELLSOL AB (Shell), which is a mixture of aromatic compounds and SHELLSOL K, which is a mixture of aliphatic compounds.

The function of the basic reagent is to decompose the chloride of the organic cation to produce the base. The basic reagent must be so chosen that the products of its reaction with the chloride of the organic cation are the base which is to be produced and water-soluble compounds which are insoluble in the organic solution of the base. Preferably, inorganic basic reagents are used, especially recommended basic reagents being the alkaline earth metal oxides and hydroxides, and more especially calcium oxide and calcium hydroxide.

The water must be used in at least sufficient amount to dissolve all the abovementioned water-soluble compounds, resulting from the reaction of the basic reagent with the chloride of the organic cation.

The solid residue of the aqueous phase consists of particles of solid which are insoluble in water and in the organic solution of the base to be produced. The residue is generally an inorganic material and can be a reaction product of the basic reagent with the chloride of the organic cation or, more generally, can consist of impurities in the basic reagent which are insoluble in the aqueous phase. In the case of a basic reagent which is insoluble in water, for example calcium hydroxide, this solid residue can sometimes also contain particles of basic reagent which have not reacted with the chloride of the organic cation. In the case where the basic reagent employed is calcium hydroxide obtained by calcination of limestone in a lime furnace, the solid residue consists mainly of calcium carbonate and water-insoluble limestone impurities, generally sand and clays.

In the process according to the invention, the organic solution of the chloride of the organic cation, the basic reagent and water are mixed intimately so as to cause the basic reagent and the chloride of the organic cation to react and liberate the base in organic solution in the solvent while the other reaction products are liberated into the water. At the end of the reaction, a mixture is collected which consists of the organic solution of the base to be produced, the aqueous phase and the solid residue. According to the invention, this mixture is subjected to phase separation so as to separate the organic solution containing the base from the aqueous phase containing the abovementioned water-soluble compounds and a sediment comprising a part of the solid residue.

By phase separation there is meant both a separation of the immiscible liquid phases under gravity and a separation of these phases by centrifuging.

The phase separation can be carried out in any suitable apparatus known per se. At the end of the phase separation the organic solution containing the base and the aqueous phase are separated by a layer of sludge; the latter consists of a mixture of the aqueous phase and the organic solution, having the appearance of an emulsion and containing suspended solid particles. These solid particles constitute a part of the abovementioned solid residue, which has not been able to sediment in the aqueous phase during the phase separation.

According to the invention, at least a part of the sludge is withdrawn and recycled into the mixture of water, basic reagent and solution of the chloride of the organic cation.

The process according to the invention is equally suitable for discontinuous or continuous operation. In the case of discontinuous operation, defined weights of the organic solution of the chloride of the organic cation, water and basic reagent are mixed in a reaction chamber, the resulting reaction mixture is subjected to phase separation, and thereafter the three superposed phases, namely the organic solution containing the base, the aqueous phase containing a sediment and the sludge located between this organic solution and this aqueous phase are collected separately, and the sludge is reintroduced into the reaction chamber with defined fresh fractions of the organic solution of the chloride of the organic cation, water and basic reagent.

In the case of continuous operation, a reaction chamber is fed continuously with the organic solution of the chloride of the organic cation, the water and the basic reagent and these are mixed in the chamber, the resulting mixture is transferred continuously into a phase separation chamber, an organic solution containing the base to be produced, a sludge and an aqueous phase containing a sediment are withdrawn continuously from the phase separation chamber, and the sludge is recycled into the reaction chamber. In this method of operation of the process, which is preferred, the rate of withdrawal and recycling of the sludge is so regulated as to maintain the thickness of the sludge substantially constant in the phase separation chamber. The choice of this thickness is not critical, its optimum value being determined by the design characteristics of the phase separation chamber intended to avoid sludge being entrained with the organic solution containing the base or with the aqueous phase.

It has been found that in the process according to the invention, if all other conditions are kept the same, the thickness of the layer of sludge between the organic solution of the base to be produced and the aqueous phase which are undergoing separation rapidly establishes itself at an approximately constant value for a substantially constant rate of withdrawal and recycling of the sludge.

In carrying out the process according to the invention it is advantageous to employ an amount of basic reagent which does not exceed the amount necessary to decompose all the chloride of the organic cation. It has been found that, all other things being equal, this form of carrying out the process according to the invention facilitates setting up steady state conditions. In this form of carrying out the process according to the invention it is, for example, possible to employ an amount of basic reagent which is greater than 50% of the amount required to decompose all the chloride of the organic cation, values of between 75 and 98% being preferred.

The invention is generally applicable to all organic bases which are insoluble in water and which with hydrogen chloride can form water-insoluble chlorides of organic cations; it is advantageously applicable to nitrogen-containing organic bases, for example water-insoluble imines and their derivatives, water-insoluble quaternary ammonium salts and water-insoluble amines and amine derivatives. The process according to the invention is equally applicable to the manufacture of primary amines, secondary amines or tertiary amines. It can be employed especially advantageously for the manufacture of primary amines from organic solutions of hydrochlorides of primary amines, and very especially of primary alkylamines containing from 18 to 24 carbon atoms, which find a valuable use in the manufacture of sodium bicarbonate by the amines technique described above. For this purpose, the process according to the invention can advantageously be combined with the said amines techniques, or it is employed to regenerate the organic solution of amine from the organic solution of amine hydrochloride which has been separated from the aqueous suspension of sodium bicarbonate. In this application of the process according to the invention it is advantageous to subject the organic solution of amine hydrochloride to a decarbonation treatment before treating it with the basic reagent; this decarbonation treatment can for example be carried out by circulating a stream of air or of inert gas through the solution, or by applying a vacuum.

The invention also relates to an installation for carrying out the process according to the invention, the said installation comprising:

a reaction chamber possessing a mixing device, means for admitting into the reaction chamber an organic solution of the chloride of an organic cation, a basic reagent and water, a pipeline for withdrawing the reaction mixture from the reaction chamber and a phase separation chamber into which opens the abovementioned withdrawal pipeline, the phase separation chamber comprising separate pipelines for removing the phases which have separated and, in the zone of separation of these phases, a withdrawal device which connects to the reaction chamber.

Special features and details of the invention will emerge from the description given below of some embodiments of the invention, with reference to the attached drawings.

FIG. 1 diagrammatically shows a particular embodiment of the installation according to the invention.

Figure 2:
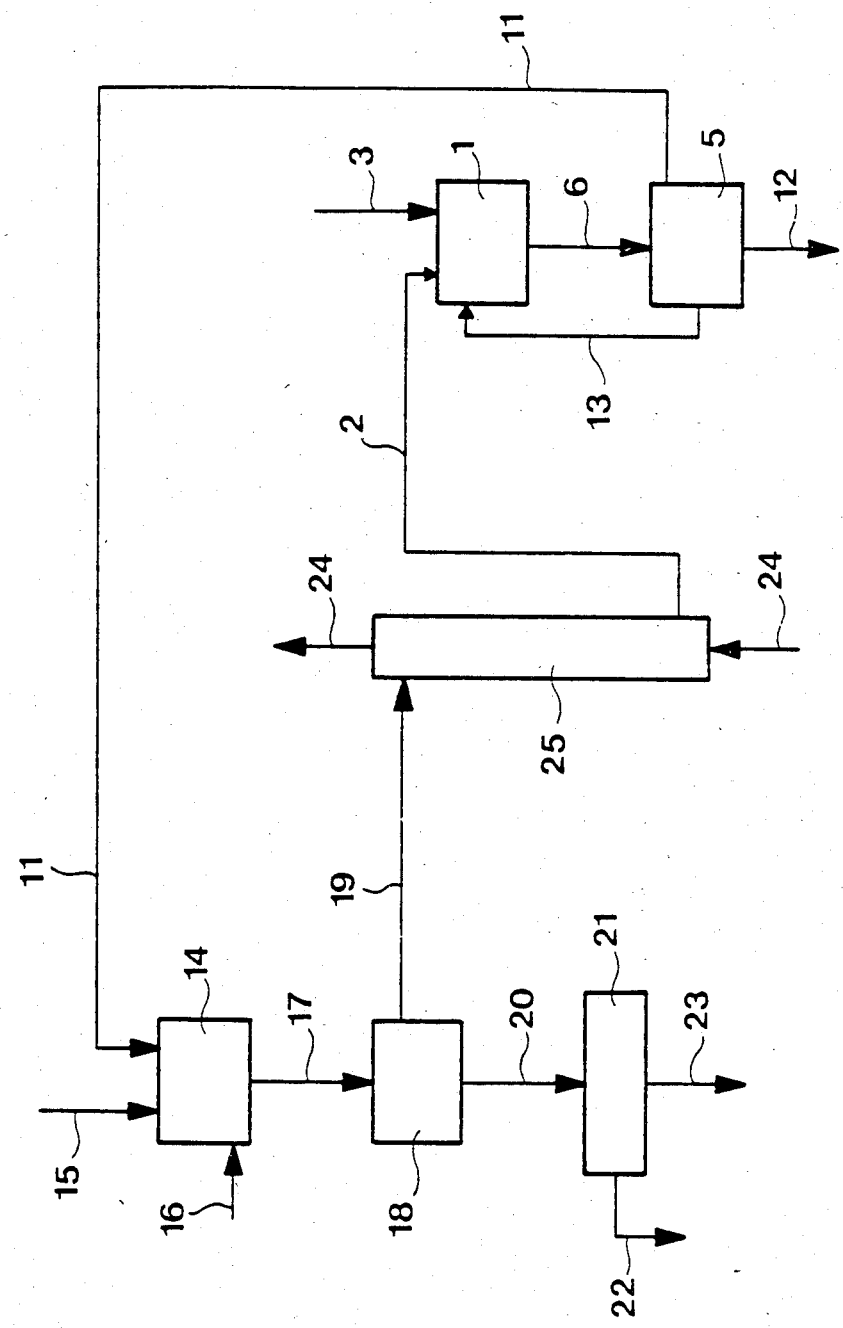

FIG. 2 is a diagram of an installation for the manufacture of sodium bicarbonate by the amines technique, employing an embodiment of the process according to the invention.

In these Figures, identical reference numerals denote identical components.

The installation shown in FIG. 1 is used for the preparation of an organic solution of a water-insoluble amine by means of the process according to the invention. To this effect, it comprises a reaction chamber 1 which is fed continuously with an organic solution of amine hydrochloride 2 and a mixture 3 of basic reagent and water, for example an aqueous calcium hydroxide suspension. A stirrer 4 ensures homogenisation of the reaction mixture in the reaction chamber 1. In the latter, the amine hydrochloride reacts with the calcium hydroxide to form an amine which passes into organic solution, and calcium chloride which passes into aqueous solution.

The installation furthermore comprises a phase separation chamber 5 which is fed continuously with a mixture 6 consisting of the organic solution of the amine and the aqueous calcium chloride solution, coming from the reaction chamber 1, this mixture 6 moreover containing particles of a suspended solid residue, generally of limestone. In the phase separation chamber 5, the mixture 6 separates to form a lower aqueous phase 7 and an upper organic phase 8 separated by a sludge 9. The upper organic phase 8 consists of the organic solution of the amine to be produced and the lower aqueous phase 7 consists of an aqueous calcium chloride solution and comprises a sediment consisting principally of limestone. The sludge consists of a suspension of particles of solid matter, principally of limestone, in a mixture of the organic solution of the amine and the aqueous calcium chloride solution, having the appearance of an emulsion. At the rate at which the phase separation chamber 5 is fed with the mixture 6, the organic solution of the amine which is produced is withdrawn from the chamber by overflow into 11; at the same time, the aqueous phase is continuously withdrawn from the lower part of the reaction chamber 5 into 12. The rate of withdrawal of the aqueous phase 7 is regulated so as to keep the sludge 9 permanently at a constant level 26. For this purpose it suffices, for example, to locate a variable-orifice throttle valve in the pipeline 12, or to locate the outlet orifice of the pipeline 12 at a suitable level above the level 26 of the aqueous phase 7, as shown diagrammatically in FIG. 1.

In accordance with the invention, a fraction 13 of the sludge 9 is constantly withdrawn and recycled via a pump 14 into the reaction chamber 1. If the flow rates of the liquids 2, 3, 11, 12 and 13 are kept constant, it is found that the height of the layer of sludge 9 assumes an approximately constant value. This height can be increased or reduced as desired by reducing or increasing the rate at which the fraction 13 is withdrawn.

FIG. 2 shows the general diagram of an installation for the manufacture of sodium bicarbonate by the amines technique described above, which incorporates a preferred embodiment of the process according to the invention. The installation comprises a crystallisation chamber 14 which is fed continuously with a substantially saturated aqueous solution of sodium chloride 15, an organic solution of a primary amine 11 which is insoluble in the aqueous sodium chloride solution, and a gas containing carbon dioxide, 16. The organic solution of primary amine can, for example, be a 50% strength by weight solution of the primary alkylamine known under the trademark of PRIMENE JMT (Rohm & Haas) in xylene. The gas 16 is preferably an enriched gas, containing 60 to 80% by weight of carbon dioxide, obtained, for example, by mixing appropriate proportions of a lime furnace gas with a residual gas from the calcination of sodium bicarbonate to give sodium monocarbonate. The amount of gas employed must be sufficient to convert a substantial part of the sodium chloride to sodium bicarbonate. As an alternative, the treatment in the crystallisation chamber 14 can be preceded by a partial carbonation of the mixture by means of a gas of low carbon dioxide content, such as a lime furnace gas.

A liquid 17 consisting of a mixture of aqueous solution and organic solution and containing suspended sodium bicarbonate crystals is withdrawn from the crystallisation chamber 14. This liquid 17 is transferred into a phase separation chamber 18 where an organic solution of amine hydrochloride 19 and an aqueous slurry 20 of sodium bicarbonate crystals are separated from one another under gravity. The slurry is passed into a draining or filtration device 21 where sodium bicarbonate 22 and a mother liquor 23 are collected separately. The mother liquor can be resaturated with sodium chloride in order to reconstitute the aqueous sodium chloride starting solution 15.

The organic solution of amine hydrochloride 19 is treated in accordance with the process of the invention so as to regenerate the organic solution of amine 11. To this effect, the solution is first subjected to a decarbonation treatment by causing it to circulate in counter-current to an ascending stream of air 24 in a vertical column 25. The decarbonated organic solution 2, collected from the column 25, is then treated in the manner described above with reference to FIG. 1, so as to produce an organic solution of amine 11 which is recycled into the crystallisation chamber 14.

The value of the invention will appear from an examination of the results of the tests of which the description now follows. In each of these tests, sodium bicarbonate was manufactured by the amines technique described above with reference to FIG. 2. To this effect, an approximately 50% strength by weight solution of the amine PRIMENE JMT (Rohm & Haas) in an aromatic organic solvent known under the trademark SHELLSOL AB (Shell) was used; the hourly feed rate of the organic solution was about 178.2 liters. To regenerate the amine, the organic solution of amine hydrochloride coming from the phase separation chamber 18 was decarbonated as described above and then treated in the reaction chamber 1 with 18 liters/hour of a milk of lime containing 148 g of calcium hydroxide per liter. The resulting mixture was homogenised and then transferred into the phase separation chamber 5 where it separated under gravity to form a lower aqueous phase 7, consisting of an aqueous calcium chloride solution, an upper organic phase 8, consisting of the solution of the regenerated amine PRIMENE JMT in the solvent SHELLSOL AB and, between these two phases, a sludge 9 having the appearance of an emulsion and containing particles, of flock-like appearance, of solid matter in suspension. Moreover, the formation of a layer of sediment in the bottom of the phase separation chamber 5 was observed, this sediment proving to be calcium carbonate.

Example No. 1 (reference test)

In the course of the test as described above, a rapid growth in the layer of sludge 9, at the expense of the organic phase 8, was observed. After four hours' operation, the entire zone of the phase separation chamber 5 reserved for the organic phase 8 was occupied by the sludge 9. To allow the test to be continued it was necessary continuously to withdraw 45 liters of sludge per hour, this sludge being discharged. The test had to be stopped after 12 hours' uninterrupted running, when the organic phase had been completely absorbed by the sludge.

Example No. 2 (test according to the invention)

In the course of the test, the height of the layer of sludge 9 was constantly kept at about 20 cm by continuously withdrawing sludge at a rate of between 20 and 80 liters/hour and recycling it into the reaction chamber 1.

The operation of the installation remained stable throughout the duration of the test, which amounted to 34 hours.

We claim:

1. Process for the production of an organic solution of a water-insoluble organic base comprising mixing together water, an organic solution of a water-immiscible chloride of an organic cation, and a basic reagent capable of decomposing the chloride of the organic cation to form the base, resulting in the formation of an organic solution phase containing the base and an aqueous phase containing a solid residue, separating the organic solution phase containing the base from the aqueous phase by difference in density, whereby an interface phase comprising an emulsion-like mixture of aqueous phase and organic solution phase containing suspended solid particles of said solid residue is formed between the organic phase and the aqueous phase, withdrawing at least a part of the interface phase which separates the organic solution phase and the aqueous phase and recycling the withdrawn interface phase to the mixture of the water, organic solution and the basic reagent.

2. Process according to claim 1, characterised in that the base is selected from among nitrogen-containing organic bases.

3. Process according to claim 2, characterised in that the base is selected from among the amines.

4. Process according to claim 3, characterised in that the organic solution of the chloride of the organic cation has a solvent selected so that the aqueous phase has a specific gravity which is at least 30% greater than that of the organic solution of the base.

5. Process according to claim 1, characterised in that the basic reagent is chosen from among the basic compounds of the alkaline earth metals.

6. Process according to claim 5, characterised in that the water and the basic reagent are employed in the form of an aqueous calcium hydroxide suspension.

7. Process according to claim 11, wherein the amount of basic reagent employed is between 75 and 98% of the weight necessary to decompose the whole of the chloride of the cation.

8. Process according to claim 3, characterised in that an organic solution of an amine hydrochloride is used which is a residual product from the manufacture of sodium bicarbonate by reacting an aqueous sodium chloride solution, a gas containing carbon dioxide and an amine in organic solution.

9. Process according to claim 8, characterised in that before treating the organic solution of the amine hydrochloride with the basic reagent the solution is subjected to a decarbonation treatment.

10. Process according to claim 1, wherein the amount of basic reagent employed does not exceed the amount necessary to decompose the whole of the chloride of the cation.

* * * * *